United States Patent Office 3,839,399
Patented Oct. 1, 1974

3,839,399
PRODUCTION OF ORGANIC CYANIDES
Charles M. Starks, Morris A. Johnson, and Kang Yang, Ponca City, Okla., assignors to Continental Oil Company, Ponca City, Okla.
No Drawing. Filed Oct. 4, 1972, Ser. No. 295,065
Int. Cl. C07c 121/06
U.S. Cl. 260—465 R                                 10 Claims

ABSTRACT OF THE DISCLOSURE

A process for catalytically producing organic cyanides which comprises reacting in a two-phase system an aqueous solution of an inorganic cyanide selected from the group consisting of alkali metal cyanides, alkaline earth metal cyanides, and mixtures thereof with an organic halide containing a —$CH_2X$ group wherein X is chlorine, bromine or iodine, in the presence of activated carbon.

DISCLOSURE

This invention relates to catalytically producing organic cyanides by reacting organic halides with inorganic cyanides. More particularly, the invention relates to catalytically producing organic cyanides in a two-phase reaction system using activated carbon as a catalyst.

Organic cyanides have a variety of uses in the chemical and pharmaceutical industry. For example, 1,4-dicyanobutane (adiponitrile) is used in producing nylon while cyanoacetamide is used in synthesizing vitamin $B_6$. Additionally, they may be hydrogenated to produce a variety of amines useful in extraction of minerals and preparation of foam boosters. Hydrolysis of the cyanides produces compounds useful as soaps.

It is generally known in the art to produce organic cyanides by direct interaction between an organic halide and an inorganic cyanide (see British 824,640 and U.S. 2,539,238) in the presence of an organic solvent. Among the solvents which have been proposed include various alcohols and ether alcohols as well as the preformed organic cyanide reaction product. However, these reaction systems suffer from the common disadvantage of sluggishness of the cyanation reaction. The addition of water to increase the solubility of the inorganic cyanide has been suggested to increase the reaction rate to some extent, but it still remains undesirably slow. It has also been proposed in U.S. 2,779,781 to employ quaternary ammonium compound as catalysts to further accelerate the reaction rate. However, depending upon the particular reaction system, these proposed catalysts may suffer from one or more disadvantages such as thermal stability; solubility in the reaction system, making recovery and separation difficult; and relatively high cost.

In accordance with this invention, there is provided a process for producing organic cyanides by reacting organic halides with inorganic cyanides in a two-phase system, organic and aqueous phases, using activated carbon as catalyst. With the process of this invention, good reaction rates are achieved in a two-phase system using a readily available and inexpensive catalyst while at the same time dispensing with the need for any organic solvent.

Broadly described, the organic halides which are suitable for use in the process of this invention generally include compounds containing a —$CH_2X$ group wherein X is a halogen atom such as chlorine, bromine or iodine. These halides encompass both cyclic and acylic compounds and may contain a wide variety of functional groups such as carbonyl; carboxyl; carboxyl wherein the hydrogen is substituted; thiocyanate; thiocyano; halogens such as chlorine, bromine and iodine; epoxy; amido; amino; mercapto; cyanate; isocyanate; pseudocyanate; tautocyanate; hydroxy; thioaldehyde; aldehyde; and the like. It is pointed out that with the process of the invention these compounds containing a —$CH_2X$ group will become cyanated by replacement of —X with —CN to some extent although with some of the compounds other reactions may predominate.

The preferred organic halides are those defined by the formula $RCH_2X$ wherein

X is a halogen atom such as chlorine, bromine and iodine; and

R is hydrogen;
a halogen such as chlorine, bromine or iodine;

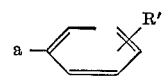

radical wherein R' is hydrogen, a $C_1$-$C_{12}$ alkyl group, a $C_1$-$C_{12}$ alkenyl group, or a

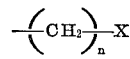

group wherein n is an integer of 1 to 12 and X is as defined above;
an alkyl radical having 1 to 30 carbon atoms;
an alkenyl radical having 2 to 30 carbon atoms;

a —$CH\underset{O}{\diagdown}CH_2$ radical;

a —$R''CR_3'''$ radical wherein R'' is a divalent saturated or unsaturated aliphatic hydrocarbon group having 1 to 30 carbon atoms and each R''' is hydrogen, chlorine, bromine or iodine;

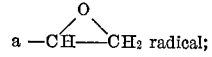

radical wherein "a" is 0 or 1 and R'' and R' are as defined above;

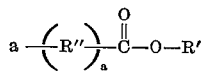

radical wherein R'', "a" and each R' are as defined above;

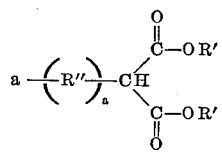

radical wherein R'', "a" and R' are as defined above;

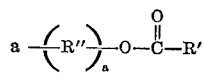

radical wherein R'' and "a" are as defined above and R'''' is an amino group, a $C_1$-$C_{12}$ alkyl group, a phenyl group or a phenyl-substituted $C_1$-$C_{12}$ alkyl group;

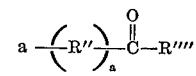

radical wherein R'' and "a" are as defined above and R''''' is hydrogen, phenyl, a saturated or unsaturated $C_1$-$C_{30}$ aliphatic hydrocarbon group, or a —$CH(C_1$-$C_{12}$ alkoxy$)_2$ group; or a —R''SCN radical wherein R'' is as defined above.

Illustrative of some of the organic halides described above are 1,4-dichlorobutane; 1,2-dichloroethane; chloroacetone; epichlorohydrin; 1-chloro-3-phenyl-2-propanone; 5-bromo-1-pentanal; propyl 2-methyl-3-chloropropionate;

chloromehyl methyl ether; diethyl β-bromoethylamalonate; α,α'-dichloro-p-xylene; 1-chloro - 4 - thiocyanato-2-butene; iodoacetamide; methyl chloroacetate; 2-chloroethyl dimethoxymethyl ether; 1,1,1,5-tetrachloropentane; 1-bromo-6-hexanol; 1,4-dichlorobutene-2; p-(chloromethyl) styrene; 2-bromoethyl acetate; ethyl 11-bromo-undecanoate; and bromomethyl phenyl ether.

The above-described organic halides are generally known in the art and are either commercially available or may be readily synthesized by one skilled in the art using ordinary organic chemistry synthesis techniques. For example, 1,4-dibromobutene-2 may be prepared by reaction of butadiene and bromine; 4-bromopentanoic acid may be prepared by reaction of butyrolacetone and HBr; 2-phenyl-1-iodoethane may be prepared by reaction of 2-phenylethanol with p-toluenesulfonyl chloride and pyridine followed by treatment with sodium iodide; m-dodecylbenzyl chloride may be prepared by reaction of dodecylbenzene with formaldehyde and HCl; diethyl (3-chloropropyl) malonate may be prepared by reaction of 1-bromo-3-chloropropane with sodio-diethylmalonate; β-bromoethyl decyl ether may be prepared by reaction of vinyl decyl ether with anhydrous HBr in presence of UV radiation; and 6-chloro-1-thiocyanatohexane may be prepared by reaction of 1,6-dichlorohexane with sodium thiocyanate.

The inorganic cyanides suitable for use in the process of this invention are the alkali metal and alkaline earth metal cyanides including mixtures thereof. Illustrative of the alkali metals are lithium, sodium, potassium and cesium whereas typical examples of the alkaline earth metals include calcium, magnesium and barium. For reasons of availability, the sodium and potassium salts are preferred. It is emphasized that the inorganic cyanide is employed as an aqueous solution. Obviously, a saturated solution avoids handling large volumes of water but is not an essential aspect of the invention as the improved reaction will take place on a comparative basis even with extremely dilute solutions.

While the reaction is not dependent upon the particular ratios of organic halides to inorganic cyanides, there will generally be employed a molar ratio of the halide reactant to the cyanide reactant in the range of about 2:1 to about 1:50 although normally it is desired to convert as much as possible of the organic halide to the organic cyanide, and, therefore, at least a 1:1 molar ratio of the reactants will be employed. It is emphasized that these molar ratios are not essential features of the process of the invention as the benefits of the invention will be achieved to some degree even when employing a large excess of one reactant.

The activated carbon, which improves the reaction rate in the two-phase reaction system, will generally be employed in amounts ranging from about 0.01 weight percent to 150 weight percent and higher based on the reactants. The phrase activated carbon is intended to include activated charcoal. Such percentages have, perhaps, more meaning in connection with a batch process; however, as described hereinafter, a continuous process may also be used in the form of a fixed or fluidized bed. In general, greater amounts will provide further increases in reaction rates. It should be noted that the upper limits on the amount of catalyst employed is solely governed by practical, operational considerations which are readily understood by those skilled in the art.

The reaction will generally be conducted at temperatures of at least about 25° C. Higher temperatures may be employed as long as they do not lead to excessive degradation of either the reactants or the reaction products. In most instances it is preferred to operate within a range of about 25° C. to about 250° C. as this will provide the most desirable reaction rates while at the same time avoiding any substantial degradation.

Pressure is not a consideration in conducting a reaction except to the extent that pressure may be necessary to maintain the reactants and reaction products in a liquid state. Thus, depending upon the reactants, reaction products and reaction temperatures, the reaction may be carried out at subatmospheric, atmospheric or superatmospheric conditions.

The reaction may be conducted on either a batch basis or a continuous basis. On a batch basis, the organic halide and aqueous solution of the inorganic cyanide are charged to a stirred vessel along with the activated carbon followed by subjecting them to the desired reaction conditions. On a continuous basis, the activated carbon may be formed into a fixed bed or fluidized bed and a mixture of the organic halide and aqueous solution of the inorganic cyanide passed through the bed on a continuous basis while being subjected to the desired conditions. As is apparent in either reaction system, the reactants form two phases with the organic halide in the organic phase and the inorganic cyanide in the aqueous phase. The organic cyanide reaction product may be recovered in accordance with standard techniques well-known in the chemistry field such as phase separation and distillation.

The following examples serve to further illustrate the process of this invention.

Example 1

The effectiveness of the process of this invention in increasing the reaction rate between an organic halide and an inorganic cyanide was demonstrated by conducting two comparative experiments under substantially identical conditions except that one employed no catalyst while activated charcoal was employed in the other.

The two experiments were conducted as a continuous series by charging about 60 g. potassium cyanide dissolved in 25 ml. water along with about 60 g. of 1-bromooctane to a 300 ml. autoclave. The autoclave was then closed and heated to about 150° C. with stirring and maintained under those conditions for about 2 hours. Thereafter, the autoclave was cooled and opened, and a small sample of the organic layer was removed and subjected to analysis by gas chromatography. The only material detected was 1-bromooctane, indicating that no reaction had taken place duringg the two-hour period. The second experiment was then conducted by adding about 5 g. activated charcoal to the reaction mixture in the autoclave. After resealing the autoclave, the reaction mixture was reheated to about 150° C. with stirring and maintained at those conditions for an additional two hours. The autoclave was then cooled and opened, and the organic phase was taken up in ether. The ether layer was separated from the aqueous phase and then filtered to remove the charcoal. The ether was then evaporated and the organic product was then analyzed by gas chromatography which indicated the product to contain about 87% 1-cyanooctane, 5% 1-bromooctane and about 8% other components.

Example 2

Similar results may be obtained by reacting ethyl 11-bromoundecanoate with an aqueous solution of potassium cyanide in the presence of activated carbon.

Example 3

The reaction between 1,4-dichlorobutene-2 and an aqueous solution of sodium cyanide in the presence of activated carbon will produce similar results as demonstrated in Example 1.

Example 4

1-cyano-6-hexanol may be produced by reacting 1-bromo-6-hexanol with aqueous sodium cyanide in the presence of activated charcoal.

Example 5

Methyl cyanoacetate may be produced by reacting methyl chloroacetate with aqueous potassium cyanide in the presence of activated carbon.

Example 6

α,α'-dicyano-p-xylene may be produced by reacting α,α'-dichloro-p-xylene with aqueous sodium cyanide in the presence of activated charcoal.

Example 7

Cyanomethyl methyl ether may be produced by reacting chloromethyl methyl ether with aqueous sodium cyanide in the presence of activated charcoal.

Thus having described the invention in detail, it will be understood by those skilled in the art that certain variations and modifications may be made without departing from the spirit and scope of the invention as described herein and defined in the appended claims.

We claim:

1. A process for catalytically producing organic cyanides by reacting in a two-phase liquid reaction system (1) an aqueous phase of an aqueous solution of an inorganic cyanide selected from the group consisting of alkali metal cyanides, alkaline earth metal cyanides, and mixtures thereof, with (2) an organic phase of an organic halide defined by the formula $RCH_2 X$ wherein X is chlorine, bromine or iodine; and
R is hydrogen;
    a halogen such as chlorine, bromine or iodine;

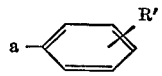

radical wherein R' is hydrogen, a $C_1$–$C_{12}$ alkyl group, a $C_1$–$C_{12}$ alkenyl group, or a

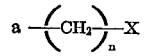

group wherein $n$ is an integer of 1 to 12 and X is defined above;
an alkyl radical having 1 to 30 carbon atoms;
an alkenyl radical having 2 to 30 carbon atoms;
a —$R''CR_3'''$ radical wherein R'' is a divalent saturated or unsaturated aliphatic hydrocarbon group having 1 to 30 carbon atoms and each R''' is hydrogen, chlorine, bromine or iodine;

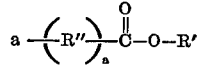

radical wherein "$a$" is 0 or 1 and R'' and R' are as defined above;

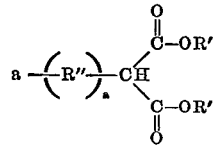

radical wherein R'', "$a$" and each R' are as defined above;

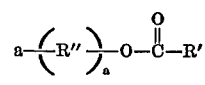

radical wherein R'', "$a$" and R' are as defined above;

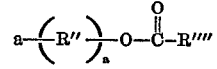

radical wherein R'' and "$a$" are as defined above and R'''' is a $C_1$–$C_{12}$ alkyl group, a phenyl group or a phenyl-substituted $C_1$–$C_{12}$ alkyl group; or

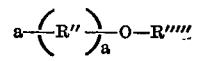

radical wherein R'' and "$a$" are as defined above and R''''' is hydrogen, phenyl, or a saturated or unsaturated $C_1$–$C_{30}$ aliphatic hydrocarbon group, in the presence of at least 0.01 weight percent, based on the cyanide and halide reactants, of activated carbon at non-degradative temperatures of at least 25° C.

2. A process according to Claim 1 wherein the inorganic cyanide is an alkali metal cyanide.

3. A process according to Claim 2 wherein the alkali metal is sodium or potassium.

4. A process according to Claim 1 where X is bromine or chlorine.

5. A process according to Claim 1 wherein R is phenyl.

6. A process according to Claim 1 wherein R is an alkyl radical having 1 to 30 carbon atoms.

7. A process according to Claim 1 wherein R is an alkenyl radical having 2 to 30 carbon atoms.

8. A process for catalytically producing organic cyanides by reacting in a two-phase liquid reaction system (1) an aqueous phase of an aqueous solution of an inorganic cyanide selected from the group consisting of alkali metal cyanides, alkaline earth metal cyanides, and mixtures thereof, with (2) an organic phase of an organic halide defined by the formula $RCH_2 X$ wherein X is chlorine, bromine or iodine; and
R is hydrogen;
    a halogen such as chlorine, bromine or iodine;
    a phenyl radical;
    an alkyl radical having 1 to 30 carbon atoms;
    an alkenyl radical having 2 to 30 carbon atoms; or
    an —$R''CR_3'''$ radical wherein R'' is a divalent saturated or unsaturated aliphatic hydrocarbon group having 1 to 30 carbon atoms and each R''' is hydrogen, chlorine, bromine or iodine;

in the presence of at least 0.01 weight percent, based on the cyanide and halide reactants, of activated carbon at non-degradative temperatures of at least 25° C.

9. A process according to Claim 8 wherein the organic halide is 1,4-dichlorobutene-2; 1,4-dibromobutene-2; or defined by the formula $RCH_2 X$ wherein X is chlorine; and
R is hydrogen;
    a phenyl radical;
    an alkyl radical having 1 to 30 carbon atoms; or
    an alkenyl radical having 2 to 30 carbon atoms.

10. A process according to Claim 9 wherein the organic halide is 1,4-dichlorobutene-2 or 1,4-dibromobutene-2.

References Cited

UNITED STATES PATENTS

| | | | |
|---|---|---|---|
| 3,725,458 | 4/1973 | Starks | 260—465.1 |
| 2,783,268 | 2/1957 | Copelin et al. | 260—465.8 R |
| 3,138,634 | 6/1964 | Rolingson | 260—465.8 R |
| 3,024,266 | 3/1962 | Freure | 260—465.4 X |
| 3,026,346 | 3/1962 | Freure et al. | 260—465.4 X |
| 3,026,347 | 3/1962 | Freure et al. | 260—465.4 X |
| 3,133,114 | 5/1964 | Freure et al. | 260—465.4 |

OTHER REFERENCES

Migrdichian: "The Chemistry of Organic Cyanogen Compounds" 1947, A.C.S. Monograph No. 105, pp. 133–137.

JOSEPH P. BRUST, Primary Examiner

U.S. Cl. X.R.

260—404, 454, 465 D, 465 E, 465 F, 465 H, 465 K, 465 I, 465.4, 465.5, 465.6, 465.8 R, 465.9

UNITED STATES PATENT OFFICE
CERTIFICATE OF CORRECTION

PATENT NO. : 3,839,399
DATED : October 1, 1974
INVENTOR(S) : Charles M. Starks et al It is certified that error appears in the above-identified patent and that said Letters Patent are hereby corrected as shown below:

Col. 1, line 69, "acylic" should be --acyclic--.

Col. 3, the word bridging lines 1 and 2, "β-bromoethylamalonate" should be --β-bromoethylmalonate--.

Col. 4, line 42, "duringg" should be --during--.

In Claim 1, Col. 5, lines 62-64, the radical should read:

Signed and sealed this 13th day of May 1975.

(SEAL)
Attest:

RUTH C. MASON
Attesting Officer

C. MARSHALL DANN
Commissioner of Patents
and Trademarks